US012602040B1

(12) United States Patent
Napoli Nishioka et al.

(10) Patent No.: US 12,602,040 B1
(45) Date of Patent: Apr. 14, 2026

(54) ROTATION SPEED DETERMINATION

(71) Applicant: Tractian Technologies Inc, Atlanta, GA (US)

(72) Inventors: Marcos Hisashi Napoli Nishioka, Florianópolis (BR); Pedro Calori Badini, São Paulo (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/372,019

(22) Filed: Oct. 28, 2025

(51) Int. Cl.
| | |
|---|---|
| *G05B 23/02* | (2006.01) |
| *G01H 1/00* | (2006.01) |
| *G01H 1/06* | (2006.01) |
| *G01H 3/08* | (2006.01) |

(52) U.S. Cl.
CPC ......... *G05B 23/0283* (2013.01); *G01H 1/003* (2013.01); *G01H 1/06* (2013.01); *G01H 3/08* (2013.01); *G05B 23/0254* (2013.01)

(58) Field of Classification Search
CPC combination set(s) only.
See application file for complete search history.

(56) References Cited

U.S. PATENT DOCUMENTS

| | | | |
|---|---|---|---|
| 7,206,646 B2 * | 4/2007 | Nixon ................ | G05B 23/0272 |
| | | | 702/182 |
| 10,649,424 B2 * | 5/2020 | Nixon .................... | G05B 17/02 |
| 10,735,691 B2 * | 8/2020 | Schmirler ............ | H04N 23/698 |
| 2023/0176557 A1 * | 6/2023 | Cella ................... | G05B 13/048 |
| | | | 700/117 |

* cited by examiner

*Primary Examiner* — Mi'schita' Henson
(74) *Attorney, Agent, or Firm* — Cognition IP, P.C.; Edward Steakley; Saleh Kaihani

(57) ABSTRACT

Multiple wireless maintenance monitors can be affixed to an industrial machine and its subcomponents. Each monitor can collect samples from the industrial machine. For some applications, including failure analysis of parts with rotating elements, measuring or estimating the rotation speeds of the rotating elements can be helpful. In many industrial machines having rotating elements that are mechanically interactive with one another, the rotating elements can have proportional rotation speeds, governed by relationship functions. Rotating elements also generate magnetic fields, which can be used to determine the rotation speeds of the elements. Embodiments include wireless monitors, equipped with magnetometers to sense the magnetic fields generated by the rotating elements and estimate rotation speeds of those components. Additional embodiments include synchronizing sample outputs from the monitors and using inner-machine relationship functions to determine unknown rotation speeds of machine subcomponents.

20 Claims, 7 Drawing Sheets

100

114

104

108

Accelerometer

106

Microcontroller

ROTATION SPEED DETERMINATION

BACKGROUND

Field

This invention relates generally to the field of wireless communication and more particularly to synchronization of techniques in wireless communication.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Industrial plants can include numerous mechanical machines with thousands of moving parts. To increase the efficiency of plant operations, the machines are monitored for maintenance purposes. Monitoring can include a trained technician visually inspecting the machines, observing the machine operations, and listening for any abnormal auditory cues that can indicate a present or potential maintenance-related fault in the machines. The technicians can also perform more sophisticated diagnosis, using maintenance and diagnostic tools. Continuous monitoring of industrial machines can present operational inefficiencies and cost to an industrial plant, particularly as the number of machines can be substantial in an industrial plant. For these and similar reasons, plants or busy shops with mechanical machines can benefit from an automated maintenance infrastructure. The automatic maintenance infrastructure can continuously collect maintenance-related data from various machines, detect maintenance-related events, and recommend appropriate action.

Many manual or automated maintenance analysis and techniques can benefit greatly from rotation speed or revolutions per minute (RPM) data of machines with rotating elements, such as motors and the like. Existing techniques can be cumbersome, difficult to implement in a large plant, and may require substantial maintenance of their own.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

FIG. 1B illustrates an exploded view of the monitor of the embodiment of FIG. 1A.

DETAILED DESCRIPTION

Figure 1A:
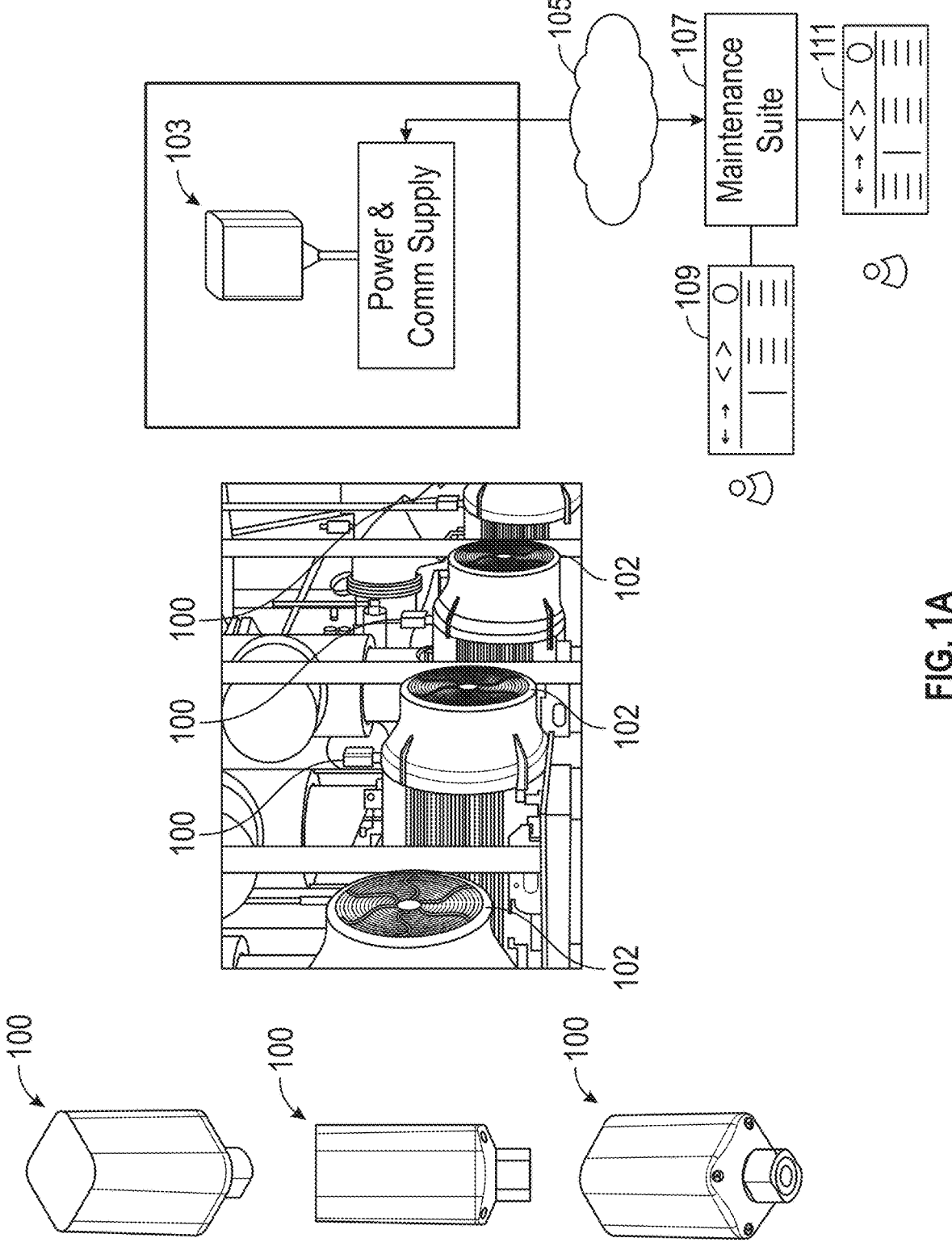
FIG. 1A illustrates example diagrams of a monitor, industrial machines, and an infrastructure of fault monitoring and maintenance operations according to some embodiments.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Industrial machines can benefit from consistent and accurate fault monitoring with artificial intelligence processing of the monitored data. In some embodiments, a plurality of small monitor assemblies, each equipped with wireless communication circuitry can be attached to various industrial machines in a plant. The monitors can sense and report various operational parameters related to fault monitoring. For example, temperature and vibration can be monitored and reported. The quality of vibrations, vibration trend data and other characteristics can be indicators of fault occurring or developing in an industrial machine. Similarly, temperature and temperature trends of a machine can include indicators of occurring or upcoming faults in the machine. Other parameters can also be collected and monitored.

FIG. 1A illustrates example diagrams of a monitor 100, industrial machines 102, and an infrastructure of fault monitoring and maintenance operations according to some embodiments. The monitor 100 can be battery operated and can include a variety of sensing components enclosed in a housing. The monitor 100 can attach to machines 102 in the plant using a magnetic connection and/or by using other methods of attachment and fastening to secure the monitors 100 to machines 102 in the plant. The attachment of the monitors 100 to machines 102 can depend on the magnitude of the vibrations and other considerations related to the environment of the machines 102 and the plant. For example, if larger magnitude vibrations are expected, the connection between the monitors 100 and the machines 102 can be secured with an adhesive agent, so the monitors 100 can maintain their connections to the machines 102, despite large vibrations.

The monitors 100 can include wireless communication circuitry and can be in wireless communication with one or more receivers 103. In some embodiments, one or more monitors 100 can be modified to be in wired communication with a receiver 103 and have a connection to an outlet source of power. In other words, the source of power and type of communication of the monitors 100 can be modified, depending on the application and the environment of the plant to include any combination of battery-operated, outlet-operated, wired communication, and wireless communication. Similarly, the receivers 103 can include both wired and wireless communication circuitry. The receivers 103 can also be powered with or without the use of a battery. In some embodiments, both the monitors 100 and the receivers 103 can wirelessly communicate to a portable computer, such as a laptop, a smart phone, a smart tablet, or other portable devices, in the field, using a local or cellular wireless network. Although the term receiver is used, the receivers can also send data to monitors 100. Consequently, receivers 103 can be transceiver devices. For example, a receiver 103 can send a configuration file to a monitor 100 to enable, disable or otherwise configure various operating parameters of the monitor 100.

The numbers and locations of the receivers 103 can depend on the size of the plant and then numbers and distances of the monitors 100, relative to the receiver 103 and the wireless communication technology used to communicate between the monitors 100 and the receiver 103. The receivers 103 can be mounted at various locations in a plant and can have connection to a power and a communication source. For example, the receivers 103 in a plant can be in wired and/or wireless communication to one or more communication portals 105. Example communication portals 105 can include a local network, the Internet, one or more cloud infrastructures, gateways, other receivers 105, and other communication midpoints, or endpoints. The receivers 103 can transmit the fault monitoring data for upstream processing. The receivers 103 can also receive various operational configuration files, settings files, and/or other operating parameters and can transmit the operating parameters to the monitors 100. Examples operating parameters can include various timing and frequency of when and how the monitors 100 should collect data from the machines 102.

A maintenance suit 107 can receive monitoring data from the monitors 100 and perform processing related to fault monitoring and maintenance operations on the data. The maintenance suite 107 can include a variety of submodules and databases that can support processing of the monitoring data, including, storage of the data, generating reports from the data, extracting trends from the data, generating fault prediction from the data, generating maintenance action items, tickets, generating alerts, and/or other automated actions related to the maintenance of the machines 102. In some embodiments, the operations of the maintenance suite 107 can include artificial-intelligence submodules that can assist in fault prediction, maintenance recommendation pattern and trend detection, and other data analytics action, augmented or generated by artificial intelligence models. Example artificial intelligence techniques and/or models used by maintenance suite 107 can include neural networks, deep neural networks, machine learning, convolutional neural networks (CNNs), random forests, and others.

The maintenance suite 107 can support a variety of user interfaces (UIs). For example, the maintenance suite 107 can support a frontend user interface 109 and a backend user interface 111. Various parameters related to the operation of the monitors 100 can be viewed and/or modified via the user interfaces 109, 111. The user interfaces 109, 111 can provide access for a user to generate or modify configuration files, settings and operating parameters for the monitors 100 and the maintenance suite 107. The users can also view the output of the maintenance suite 107 via the user interfaces 109, 111.

While not shown, the monitors 100 are not the only maintenance-related in-field components operated by the maintenance suite 107. Other components associated with monitoring and maintenance of the machines 102 and the plant can also be in communication with the maintenance suite 107. For example, in some embodiments, energy management components in communication with the maintenance suite 107, can monitor the power consumption of the machines 102 and/or the plant.

Depending on the size of an industrial plant, the monitors 100 can be numerous, for example in the hundreds or thousands. The maintenance suite 107 can streamline and track data from hundreds or thousands of machines and automate the identification and tracking of maintenance-related tasks for a large industrial plant, having hundreds or thousands of machines 102.

Figure 1B:
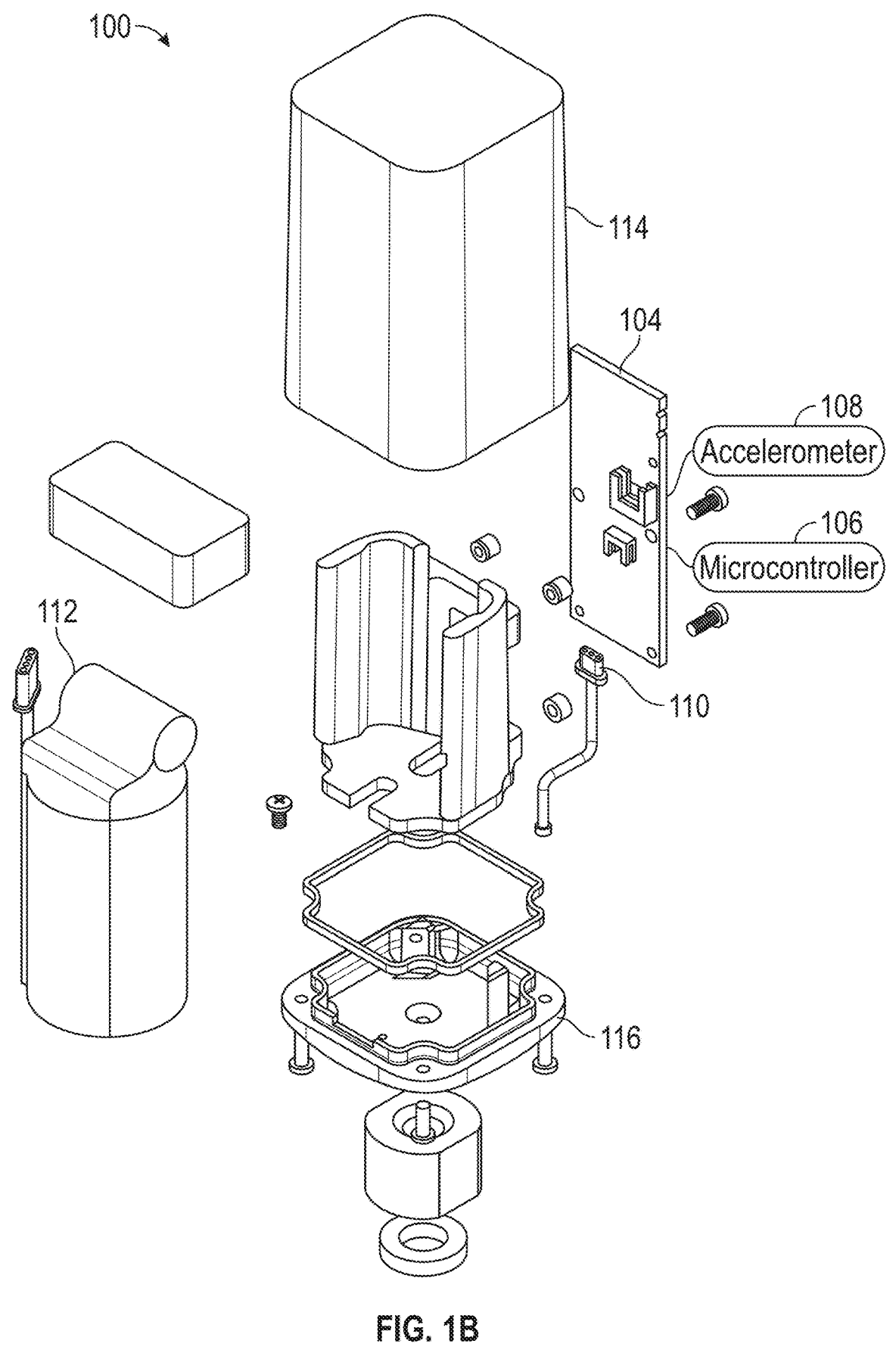

FIG. 1B illustrates an exploded view of an example monitor 100. Some example components include the printed circuit board (PCB) 104, the microcontroller 106, an accelerometer 108, a temperature sensor 110, a battery module 112, various spacers, holders, internal conduits, and a housing 114. In some embodiments, the monitor 100 can include a magnetometer. Various technologies of magnetic field measurement can be used, including scalar or vector magnetometers. The housing 114 can house the internal components of the monitor 100. A housing lid 116 can enclose the housing 114 and seal the internal components of the monitor 100 from the outside. The monitor 100 can be made water-, dust- and particle-resistant by a variety of techniques. For example, in some implementations, the monitor 100 can be resin-coated. The battery module 112 can include one or more lithium-ion batteries, and a battery management system (BMS). In other embodiments, the BMS can be external to the battery module 112, for example, it can be mounted on the PCB 104. In some embodiments, the life expectancy of the battery module 112 can be between three to five years.

The monitor 100 can include communication circuitry, corresponding to the communication circuitry of one or more receivers, for example, the receivers 103, and one or more local, private and/or public communication network, including one or more cellular networks. The choice of network and communication circuitry can depend on the size of the plant and the distance of the monitor 100 from a receiver 103. The communication circuitry of the monitor 100 can be mounted on the PCB 104. In some embodiments, the communication circuitry may be integrated in the microcontroller 106. Similarly, in other embodiments, various components can be combined into one or use a component that integrates several components together. The monitor 100 can include a magnetic collar to provide magnetic attachment between the monitor 100 and the machine 102. In some embodiments, the temperature sensor 110 can be routed to a surface very near the point of contact between the monitor 100 and the machine 102 to provide a more accurate reading of the temperature of the machine 102.

The accelerometer 108 can be a micro-electro-mechanical system (MEMS) accelerometer, capable of one, two, or three axis acceleration data. For example, in some embodiments, the accelerometer 108 can measure forces in three directions along the XYZ axes. The microcontroller 106 can receive the acceleration data, for example, as a function of time, from the accelerometer 108, and can generate spectral data of the vibrations of a machine 102.

The microcontroller 106 can be a collection of various components, including computer or computing components. Example components of the microcontroller 106 can include a processor, such as a central processing unit (CPU), permanent and impermanent memory, including for example, random access memory (RAM) of various kinds, solid state, flash or other permanent memory, interconnects, buses and communication vias between the various components. In some embodiments, the microcontroller 106 can include external communication circuitry to enable wireless communication, including radio frequency identification (RFID), Bluetooth, cellular, or other communication technologies. In other embodiments the monitor 100 can include dedicated wireless communication circuitry, fabricated or included in the monitor 100, in a separate component than the microcontroller 106.

The monitors 100 can be configured to spend the majority of their time in hibernation state to conserve battery power. In hibernation mode, the power to all or some of the components of the monitor 100 can be reduced or minimized, thereby reducing the overall battery consumption in the hibernation state. The monitors 100 can be configured to periodically exit hibernation mode and enter normal operation mode, where power and functionality to some or all components is restored. For example, the monitors 100 can perform periodic sampling of various operational parameters of the machines 102, such as temperature and vibrations. When scheduled sampling is not performed, the monitors 100 can be in hibernation mode.

The monitors 100 can perform a variety of samplings of machine operation parameters. For example, for the vibration parameter of the machines 102, the monitors 100 can perform various samplings at different intervals and with different characteristics. Example sampling characteristics can include sampling intervals, sampling frequency, sampling range, sampling resolution and other characteristics. Sampling interval can refer to the period by which the monitor 100 turns ON and performs a sampling with a selected set of sampling characteristics. In some embodiments, the monitors 100 can be configured to perform scheduled sampling sessions, which are samplings performed at selected intervals. The selected intervals can depend on the type of machines 102 and other factors that are application-dependent, based on where the monitors 100 are used. Example sampling intervals can include sampling with intervals separated by minutes, hour or hours, days, or even months, and other intervals.

The monitor 100 is a battery-operated device. In most applications extending the longevity of the monitor 100 is proportional to the longevity of the battery module 112. A significant portion of the battery consumption of the monitor 100 relates to the transmission of data to the receiver 103. At the same time, typical industrial environments of the monitor 100 and the receiver 103 can present challenges for wireless transmission of data between the two devices. For example, industrial environments can introduce substantial noise and interference to wireless transmission of data between the two devices. Various wireless communication frameworks exist and can be utilized for transfer of data. A wireless communication framework can provide a basic level of functionality between transmission nodes. Referencing the open systems interconnection (OSI) model, various existing wireless communication frameworks can provide some of the functionality for wireless transmission of data between a monitor and a receiver. For example, an existing wireless communication framework can provide a physical layer for wireless transmission of data between the monitor and the receiver, using radio waves.

The monitor 100 is but one example device, which can be used in a maintenance and monitoring infrastructure. Other devices may also be used. For example, some industrial machines 102 can include an integrated sensor, which reports on the operational parameters of the machine.

Industrial machines, or assets (as maintenance professionals may call them), can include discrete components that together make up the functionality of the machine. For example, one asset can include a motor, a reducer and a pump. Often monitors 100 are placed in multiple subcomponents of an asset to monitor one or more operating characteristics. Each monitor 100 can independently collect machine operation data, corresponding to the component to which the monitor 100 is affixed. When an asset includes multiple sub-components, a collection of monitors 100 can form a group, allocated to collecting machine samples for an asset, where each subcomponent has at least one monitor collecting samples from it. Although, other group configurations can also be defined by maintenance personnel, where not every sub-component is monitored.

In terms of failure analysis of the sample data from industrial machines 102, particularly in the case of machines with rotating components, a helpful parameter is the rotation speed of a rotating component, typically expressed as a revolutions per minute (RPM) parameter. In a mechanical system, used in an asset with multiple mechanical subcomponents, the RPM of the components that mechanically interface with one another, can be related. Therefore, knowing the RPM of one component can serve as a reference. RPMs of the components can be used in spectral analysis that manual or automated maintenance models may use. In particular, the RPM information can be used to identify relevant portions of the sampled data to analyze for maintenance-related considerations. RPM information, however, may not readily be available in many industrial plants for a variety of reasons. Many machines do not have a built-in RPM encoder (a gauge that either estimates, or measures the RPM of a component). Also, many components of interest to maintenance-related models, may be embedded inside complex machinery, sealed, or otherwise inaccessible, leaving critical RPM data out of reach of typical RPM measurement devices. Still in many cases, manufacturers or custodians of equipment may be unwilling to share RPM data with the maintenance infrastructure, or not have the tools and/or expertise to access RPM data hidden behind a proprietary interface.

Various techniques exist for determining the RPM of a component, externally. Some vibration acquisition and analysis systems utilize a key phaser to measure RPM data. A laser key phaser is an example. A shaft of a rotating component can be marked with a target marking facing the laser key phaser. Every time the key phaser sees the marking, the shaft has made a revolution. By knowing the sampling frequency of the key phaser, the number of samples in one revolution of the shaft can be determined. From the number of samples, the speed of rotation of the shaft can be determined. In practice, key phasers present challenges, and are difficult to maintain and use. For example, in many industrial environments, the key phaser markings are inadvertently erased, or the alignment of the key phaser and the marking can easily be disturbed, rendering the key phaser output unreliable. Furthermore, many maintenance-critical components can be embedded inside a machine, in a manner that implementing an external RPM encoder can be impractical. Additionally, a robust maintenance infrastructure or platform may require independent and platform-controlled sources of measuring RPM. In some respect, the disclosed embodiments address the challenges, related to this goal, and improve the field RPM determination in an industrial plant.

In some embodiments, an RPM encoder or RPM estimator, can select an initial guess and generate at an estimation of the RPM of a component, at least in part, by determining the harmonics of a vibration sample signal from that component and iteratively improving the first guess. The initial guess of the RPM encoder can be improved with a reliable source of RPM. In some embodiments, the monitors 100 can be equipped with a magnetometer. Rotating components, in particular motors can generate a magnetic field, which is measurable by a magnetometer of a monitor 100. While the rotating components can also have a "slip," which is the difference between the mechanical RPM and the magnetic RPM. Nonetheless, the magnetic RPM data can still provide a reliable source of information in lieu of, or in addition to pure vibration data, as an initial guess for an RPM encoder.

A signal that can provide valuable insight for failure analysis includes vibration signal obtained from an industrial machine. Vibration signal from a machine can be the subject of artificial intelligence (AI) or manual vibration analysis techniques, which can provide insight regarding maintenance status of the machine. Vibration analysis can include determining what frequencies are observable in the vibration spectrum and potential causes for those frequencies. For example, some spectrum frequencies can relate to mechanical and some can relate to electrical phenomena. Having rotation speed of a machine can be a helpful element in such vibration analysis.

Figures 2, 3:
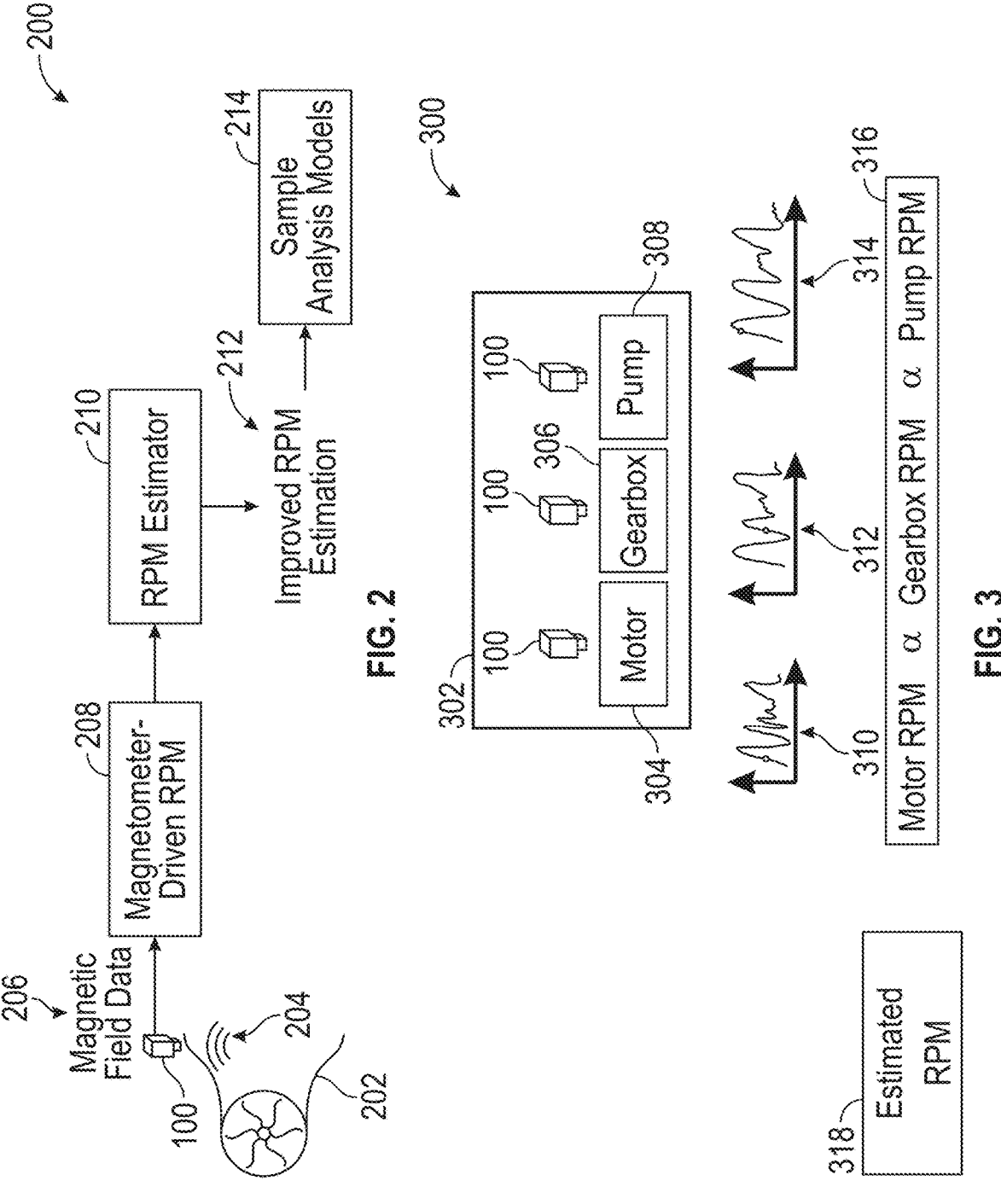
FIG. 2 illustrates a diagram of a monitor, equipped with magnetometer and used in a maintenance platform.
FIG. 3 illustrates a diagram of an example asset, having three subcomponents.

FIG. 2 illustrates a diagram of a monitor 100, equipped with a magnetometer and used in a maintenance platform. The monitor 100 can sample a signal, for example, a vibration signal, from the industrial machine 202. The machine can have a rotating component, which generates a magnetic field that is proportionally related to the rotation speed of the machine. The magnetometer of the monitor 100 can capture the magnetic field 204 and transmit magnetic field data 206 to the platform or an internal RPM calculation module. The magnetic field data 206 can be used to generate a magnetometer-driven RPM 208. Some machines 202 yield better RPM measurement results, via magnetic field. For example, industrial motors yield relatively more reliable magnetometer-driven RPM, compared to other machines. An RPM estimator 210 can generate an improved RPM estimation 212, based on the magnetometer-driven RPM 208. In some embodiments, the RPM estimator 210 operates in part by selecting an initial guess for the RPM and then determining the harmonics of that initial guess, and iteratively improving the initial guess. The RPM estimator 210 processes can be difficult or unavailable in some circumstances, for example, when the harmonics are not readily ascertainable. In those and other scenarios, the magnetometer-driven RPM 208 can substantially improve the accuracy and efficacy of the RPM estimator 210. In particular, for example, the RPM estimator 210 can use the magnetometer-driven RPM 208 as an initial RPM guess, which can improve the search for the harmonics near the initial guess, which can in turn yield a more accurate (close to the real) RPM of a machine.

The improved RPM estimation 212 can be used in sample analysis models 214, directed to failure analysis or other purposes. Using the magnetometer-driven RPM 208 and the RPM estimator 210 can provide a way to measure the RPM of inaccessible rotating components, as well as a way to improve the estimation of the RPM estimator 210.

Monitors 100 can be deployed in multicomponent assets, where some or all discrete subcomponents of an asset can have their corresponding monitor 100. Monitors 100 can also be deployed at interfaces of the subcomponents, or at various locations in an asset, depending on where monitoring points are desired or selected. Obtaining samples from subcomponents or different areas of an asset can provide insight into maintenance issues of the asset. Furthermore, operating parameters of machine subcomponents can be related to one another, via one or more functions. For example, in the case of machines with rotating parts, the rotation speed of various subcomponents can be related. The relationship (function) between subcomponents can be used in extracting insight about machine operations and maintenance. For example, for vibration analysis, the RPM of each subcomponent can be related to the RPM of other components that are in mechanical contact with one another.

FIG. 3 illustrates a diagram 300 of an example asset 302, having three subcomponents. Example vibration signals from each subcomponent, and a statement of relationship between the subcomponents are also shown. The asset 302 includes a motor 304, connected to a pump 308, via a gearbox 306. Each subcomponent is being monitored by a monitor 100. The monitors capture the vibration signals for each subcomponent. The subcomponents RPMs are related through a relationship function 316. An estimated RPM 318 for one of the components can be used to derive the RPM of another component, using the relationship function 316. Relationship function 316 and similar ones can be used to derive the unknown RPMs of some subcomponents from an estimated RPM of another subcomponent, when the vibration signals 310, 312, 314, from the subcomponents are synchronized, acquired at the same time or are otherwise aligned. In other words, when the vibration signals 310, 312, 314 are synchronized, they can have a proportional component of vibration as far as their rotation speed.

Some subcomponents yield more improved magnetometer-based RPM readings. In these scenarios, the RPM of those subcomponents can be more accurately determined and used to determine a more accurate RPM figure for the other subcomponents. For example, the motor 304 can yield more accurate magnetometer-based RPM readings, which can be used to determine more accurate RPM readings for the gearbox and the pump, using the relationship function 316. Furthermore, the more accurate RPM figure determined in this manner for all subcomponents can be the basis of more improved failure analysis via for example vibration analysis.

Another advantage of having independent monitors 100 on various subcomponents is that each monitor 100 can be independently configured and independently used for failure analysis. While retaining their independent sampling or monitoring point, when the output of the monitors 100 are synced, or when they collect their samples at the same time, the synchronized outputs can be the basis of RPM-based spectrum failure analysis that in part utilizes the relationship function 316. The same principles described above can be extended to more complex assets, having more than three subcomponents and multiple of monitoring points, and their corresponding monitors 100.

Figure 4:
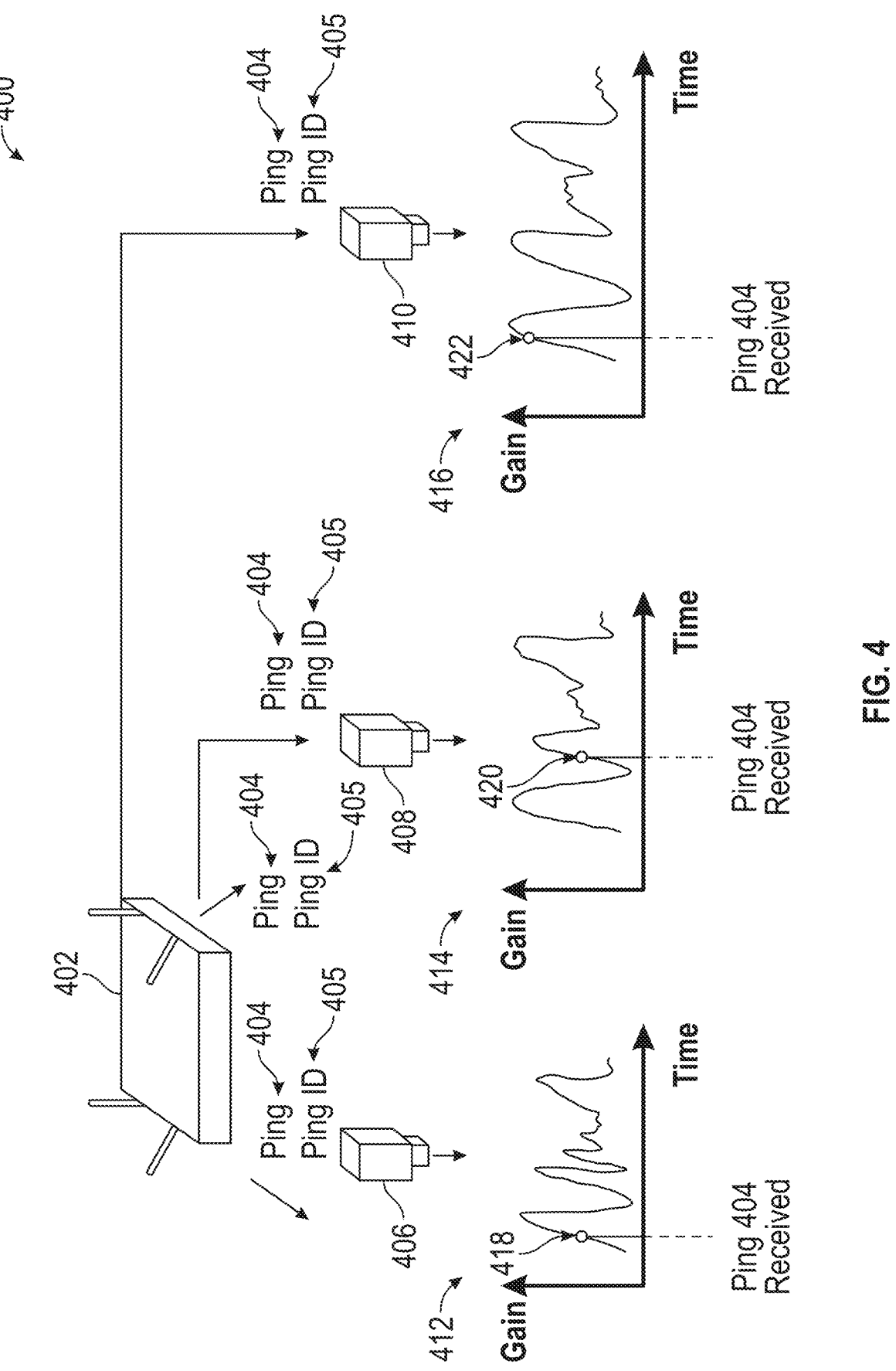
FIG. 4 illustrates a diagram of synchronizing three monitors according to one embodiment.

FIG. 4 illustrates a diagram 400 of synchronizing three monitors according to one embodiment. Other synchronization methods can also be used. Monitor 406 generates the vibration signal 412. Monitor 408 generates the vibration signal 414. Monitor 410 generates the vibration signal 416. The monitors 406, 408, 410 can correspond to different monitoring points in an asset with three subcomponents, such as a motor, a gearbox and a pump, as described in relation to FIG. 3. The monitors 406, 408, 410 belong to a group. In other words, their output upstream in the maintenance platform can be logically grouped together in a server. The monitors 100 are in wireless communication with a gateway 402. The gateway 402 can periodically send synchronization pings 404, having synchronization identifiers 405. The synchronization ping identifier 405 can be updated (for example by incrementing a counter) for each ping interval.

Each monitor can have an internal time reference, which can, in reality be offset or out of sync from the other monitors 100. This scenario can happen and does frequently happen in practical applications, where the internal clocks of the monitors 100 can drift from one another, even though they may have at an earlier time been calibrated to be synchronized. In many instances, even the initial synchronization of the monitors can be difficult or impractical to achieve, particularly within the degree of drift that may be necessary for the failure analysis models. In many such models, even typical drifts exhibited by most wireless devices can render some useful failure analysis techniques unreliable or inapplicable. For example, application of relationship functions 316 can require a more precise synchronization of the signals that any current device clock synchronization techniques can provide.

In some synchronization embodiments, the monitors 406, 408, 410 can be synchronized using any clock synchronization technique of reasonable reliability, within some margin of error or drift from one another. The monitors can be configured to record a sample identifier and the synchronization ping identifier 405, when the monitors receive a ping 404. In the example shown, the monitor 406 receives a synchronization ping 404 when collecting sample 418. The monitor 408 receives the same synchronization ping 404 when collecting sample 420. The monitor 410 receives the same synchronization ping 404 when collecting sample 422. The monitors need not necessarily record the time they received the synchronization ping 404, as their clocks are not quite synchronized, but only the sample identifier of the sample the monitor was collecting when the monitor received the synchronization ping. In the example shown, the samples 418, 420, 422 were collected at the same time. Those samples can be used as alignment reference points. Vibration signals 412, 414 and 416 can be shifted to align them based on the alignment reference points. Once aligned, or synchronized, the vibration signals can be used in relationship functions, such as the relationship 306 and corresponding spectrum analysis on the vibration signals can be performed.

An advantage of the independent arrangement of the monitors 100, at various monitoring points is that each monitor can be independently configured to correspond to desired monitoring parameters of their respective monitoring points. For example, if a monitor 100 is affixed to a slower moving machine part, it can be configured to acquire samples for a longer duration of time, compared to monitors affixed to other monitoring points. For example, a pump can be sampled at eight seconds, a gearbox at eight seconds, and a motor at two seconds. The output samples (signals) can be aligned using an alignment technique, such as the technique described in relation to FIG. 4. The aligned output signals can be used with a relationship function to determine the rotation speed of some subcomponents, at least in relation to the time interval, where all aligned signals overlap (two seconds in this example). For the overlap interval in the aligned signals, the relationship function holds true, and the rotation speeds of the components are proportional and related according to the relationship function. Outside the overlap interval, the relationship function can still be used, when the operational circumstances of the subcomponents are such that a change in the rotation speed of the subcomponents, outside the overlap interval, is unlikely. In this example, and similar scenarios, the motor rotation speed can be determined from a magnetometer-driven estimated RPM, and that RPM can be used in a relationship function 306, describing the RPM relationship of the motor, the gearbox and the pump to derive the RPM of the gearbox and the pump.

The relationship functions are machine-dependent. For example, the structure, number and type of the subcomponents, configuration and arrangement of the subcomponents can determine the relationship function that governs the rotation speed of various rotating subcomponents in an asset.

Figure 5:
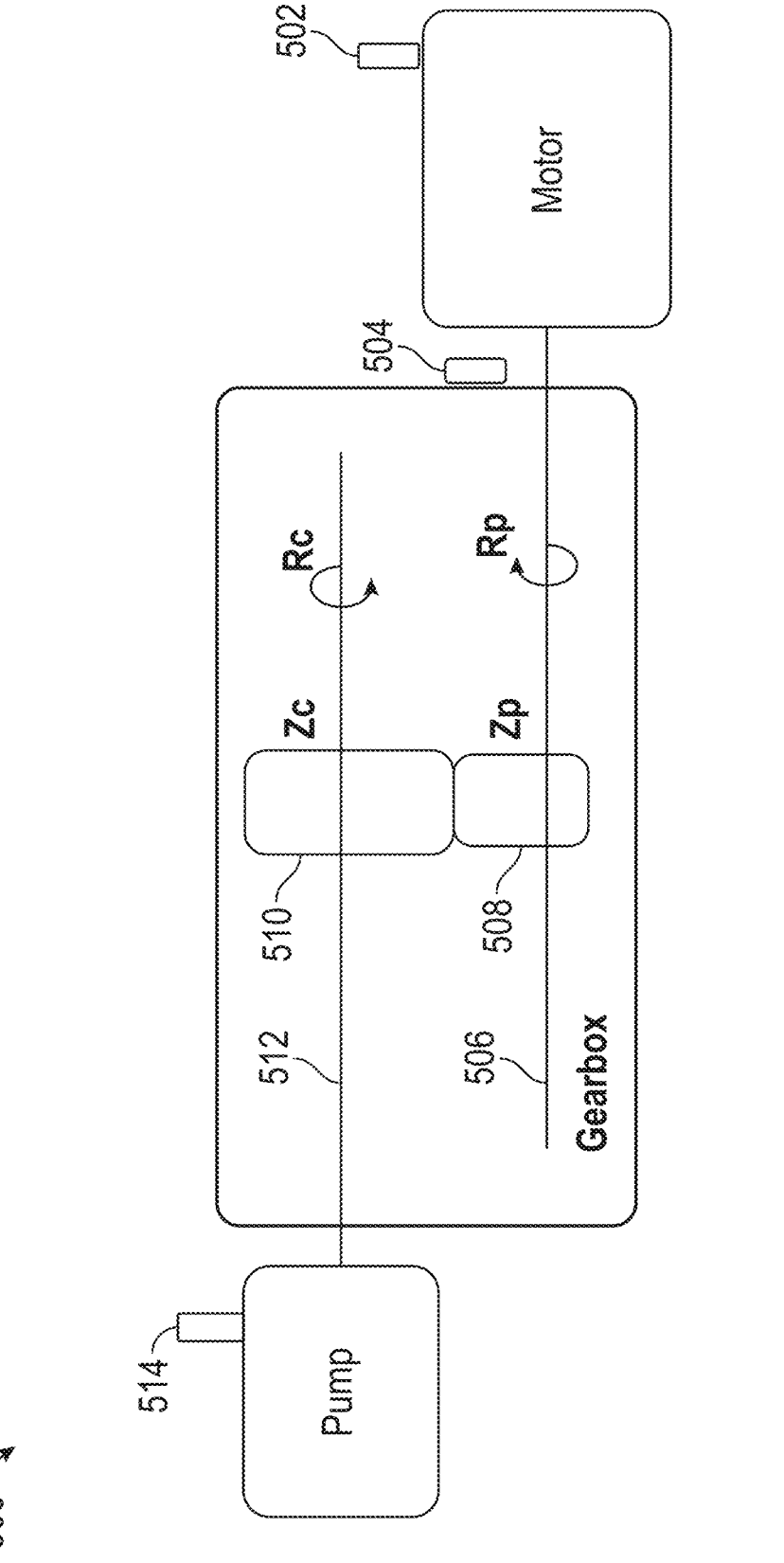
FIG. 5 illustrates a diagram of an example asset, its subcomponents, and monitors at various monitoring points.

FIG. 5 illustrates a diagram of an example asset 500, its subcomponents, and monitors at various monitoring points. Asset 500 includes three subcomponents, a motor, a gearbox and a pump. A monitor 502 monitors the vibration signal of the motor. The monitor 502 can be equipped with a magnetometer and can generate a more reliable estimate of the RPM of the motor using the techniques described above. A monitor 504 is placed at a monitoring point near the gearbox on a shaft 506. The shaft 506 mechanically connects the motor to the gearbox. Inside the gearbox, the shaft 506 transfers the rotational energy of the motor to a pinion gear 508. The shaft 506 rotates at rotation speed "Rp." The pinion gear 508 has a parameter "Zp," corresponding to the number of teeth of the pinion gear 508. The pinion gear 508 is mechanically engaged with a wheel gear 510. The wheel gear 510 has a parameter "Zc," corresponding to the number of teeth of the wheel gear 510. The wheel gear 510 rotates a shaft 512, with rotation speed "Rc." The shaft 512 connects the wheel gear 510 to the pump. The vibration signals of the pump are monitored with a monitor 514. In this arrangement, the rotational energy of the motor is transferred to the pump via the shaft 506, the pinion and wheel gears 508, 510, and the shafts 506, 512. The relationship function for the asset 500, with the described arrangement of its subcomponents is described in Equation (1).

$$Rc*Zc=Zp*Rp \qquad \text{Equation (1)}$$

"Rp" corresponds to the motor RPM, which can be determined from the magnetometer-based estimated RPM, derived from the readings of the monitors 502 and/or 504. The relationship function expressed in Equation (1) along with the value of "Rp" can be used to determine the value of "Rc." The asset 500 is a one stage gearbox, and is only provided as an example. Other assets might have different gearboxes and different arrangements of gearboxes. For example, multistage gearboxes and planetary gearboxes all right additional possibilities. The described embodiments provide a more reliable reference RPM to exploit relationship functions and perform vibration analysis.

In some embodiments, a more reliable rotation speed of a component can be determined using magnetometer-driven RPM estimation. The estimated RPM can serve as a reference. A relationship function, along with the reference RPM can be used to determine the rotation speed or RPM of other subcomponents. The determined RPMs can further be used to fine tune, adjust or otherwise better configure monitors corresponding to those subcomponents to acquire vibration samples more relevant and closer to their real RPM, thereby increasing the efficiency and accuracy of failure analysis, using those samples. The failure analysis can be performed manually, automatically (e.g., by using AI), or semi-automatically (e.g., by an expert vibration analysis engineer examining graphs generated from the samples). In the example above, the RPM estimation from sensor 502 can be used to configure the sensors 504 and 514. For example, the estimated "Rp" can yield the value of "Rc," via Equation (1). The sample collection parameters based on the derived value of "Rc" can yield vibration spectrum samples closer to the real RPM of the pump and the gearbox, allowing for more accurate failure analysis.

Another application of the described technology is to use the derived RPMs to configure the monitors to collect samples relevant to a selected type of failure analysis. In other words, the RPM data can be used to direct the sampling of the monitors to collect samples in a portion of the spectrum more relevant to a selected failure type. The selected failure type can be governed by or related to a machine operation relationship. Machine operation relationships can be, at least in part, a function expressing frequency in terms of the rotation speed of a subcomponent of a machine. The frequencies can be relevant to and useful for failure analysis. In the example shown above, blade defect in a pump can relate to blade frequency ("BF") governed by the machine operation relationship (BF=Nb*Rc), where "Nb" is the number of blades and "Rc" is the turning speed of the pump. As described above, the value of "Rc" can be determined from the Equation (1) and the value of "Rp." The determined value of "Rc" can be used to determine the blade frequency "BF" and ranges of frequencies related or close to the blade frequency. Monitor 514 can be configured to collect spectrum data, related to or corresponding to a selected failure type analysis, which in this example includes spectrum frequencies, or frequency ranges encompassing, or near the blade frequency range, "BF."

The assets described above are provided as examples. The described embodiments can be applied to any type of asset, having rotating components, mechanically engaged and related to one another through a relationship function. Other example assets can include various types and configurations of motors, and gearboxes, pulleys and belt systems, and assets having rotating components with chain, used to transfer rotating energy. In all these and similar assets, a technical problem of acquiring the rotation speed of the components exist. Key phasers and similar external devices rely on markings, laser and near perfect sensor alignment to acquire rotation speed data. They, however, have their challenges, including requiring substantial upkeep and maintenance to ensure the markings are not erased and the sensors are aligned with the markings. The described embodiments, on the other hand, include a magnetometer-equipped wireless sensor (monitor), which can externally be affixed to an asset or multiple subcomponents of the asset to generate a more reliable estimation of the rotation speeds within the asset and its subcomponents. Furthermore, the ability of the magnetometer-equipped wireless monitors to detect, determine or estimate the RPM of internal rotating subcomponents can allow vibration analysis engineers or vibration analysis models to gain a more precise understanding of the operation of an asset system, when vibration samples can be acquired for the subcomponents in spectrum regions more relevant to failure analysis of interest.

An Alternative Synchronization Technique

In some embodiments, the monitors in a group can be initialized to start executing their respective sampling profiles at the same time. Due to clock drift and initial synchronization imperfections, the monitors may start sampling at different times. Each monitor can be configured to record the time at which the monitor receives a ping from a shared gateway with the other monitors. The ping reception times are compared. The latest ping reception time can be selected as a synchronization point. The sample outputs from each monitor can be treated to be nearly synchronized for the portion of the sample output, collected after the latest ping reception time.

Figure 6:
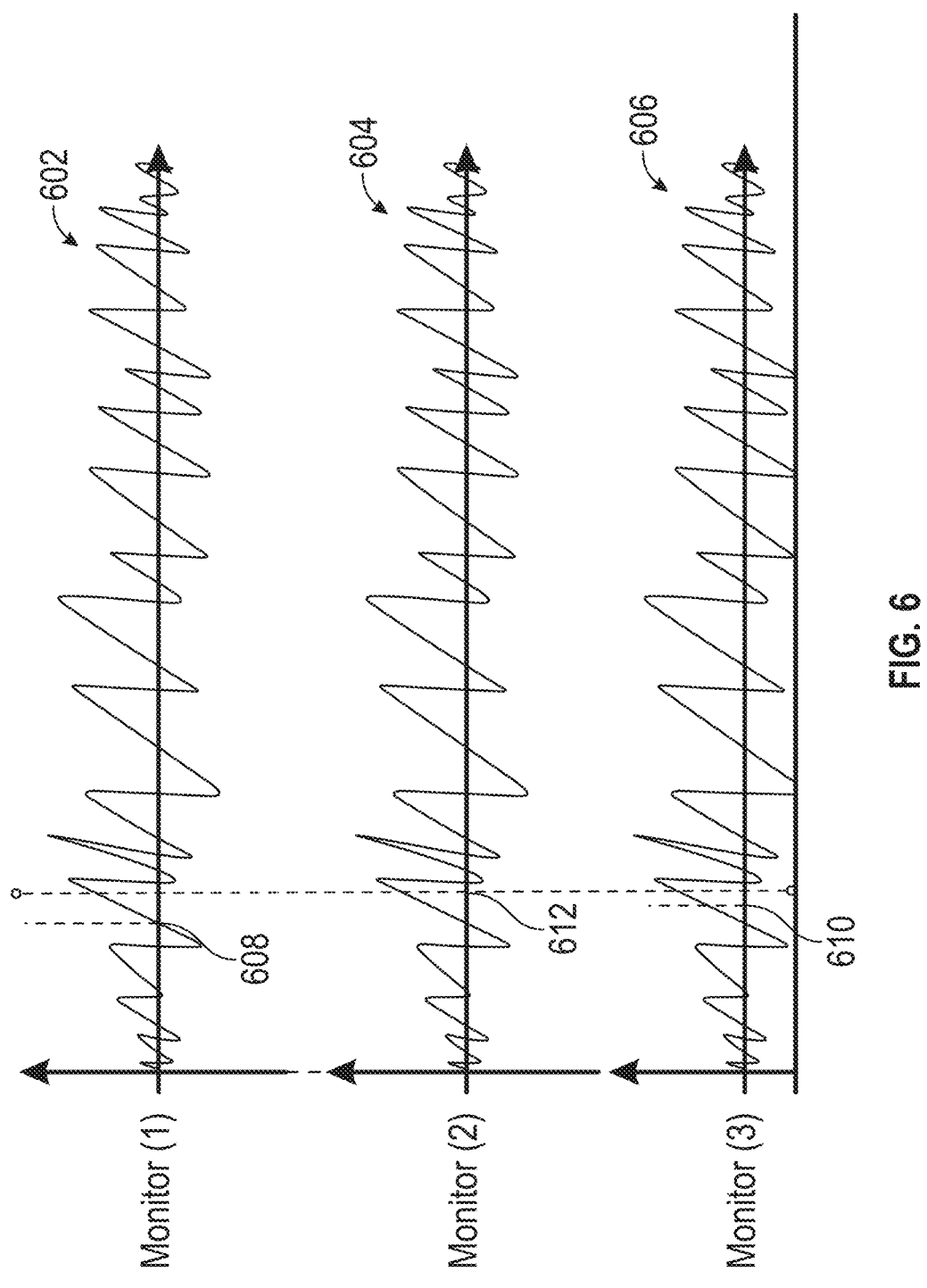
FIG. 6 illustrates sample output graphs related to an alternative synchronization.

FIG. 6 illustrates sample output graphs 600 related to the alternative synchronization technique described above. Three sample output graphs 602, 604, 606, corresponding to a first, second and third monitor, respectively, are shown. The monitors are initially synchronized. A gateway (not shown) or another monitor broadcasts pings to the monitors. The first monitor receives the gateway ping at time 608. The second monitor receives the gateway ping at time 612. The third monitor receives the gateway ping at time 610. In the example shown, the first monitor has received the gateway ping first, then the third monitor has received the gateway ping, and finally the second monitor has received the gateway ping last, at time 612.

The gateway (or another monitor) broadcasts pings with unique identifiers. Each monitor receives the ping and records the time the monitor received the ping, according to the internal clock of the monitor receiving the ping. For example, the first monitor can receive the ping at time 608. The second monitor at 612, and the third monitor at 610. Each ping, recorded at each monitor can be assumed to have occurred at the same time for all three monitors, assuming negligible propagation delay when the monitors are relatively close to one another. With the reception timing information, recorded by each monitor, the amount of time difference between the monitors can be calculated and used to calibrate the monitors, relative to one another, based on the recorded ping reception time of each.

In the example shown, calibration can include selecting the first monitor as a reference. The clock of the second monitor can be delayed by (−4) units, and the clock of the third monitor can be delayed by (−2) units. In this manner, the clocks of all three monitors can become synchronized.

In some embodiments, the timestamp annotations of the received pings can be recorded in each receiving monitor locally. The monitors can transmit the timestamps to a cloud infrastructure, along with sample data. The calibration and clock adjustments of the collected samples can be performed in an upstream post-processing step, for example, within a cloud infrastructure, implemented by the maintenance and monitoring infrastructure.

Example Implementation Mechanism-Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 7:
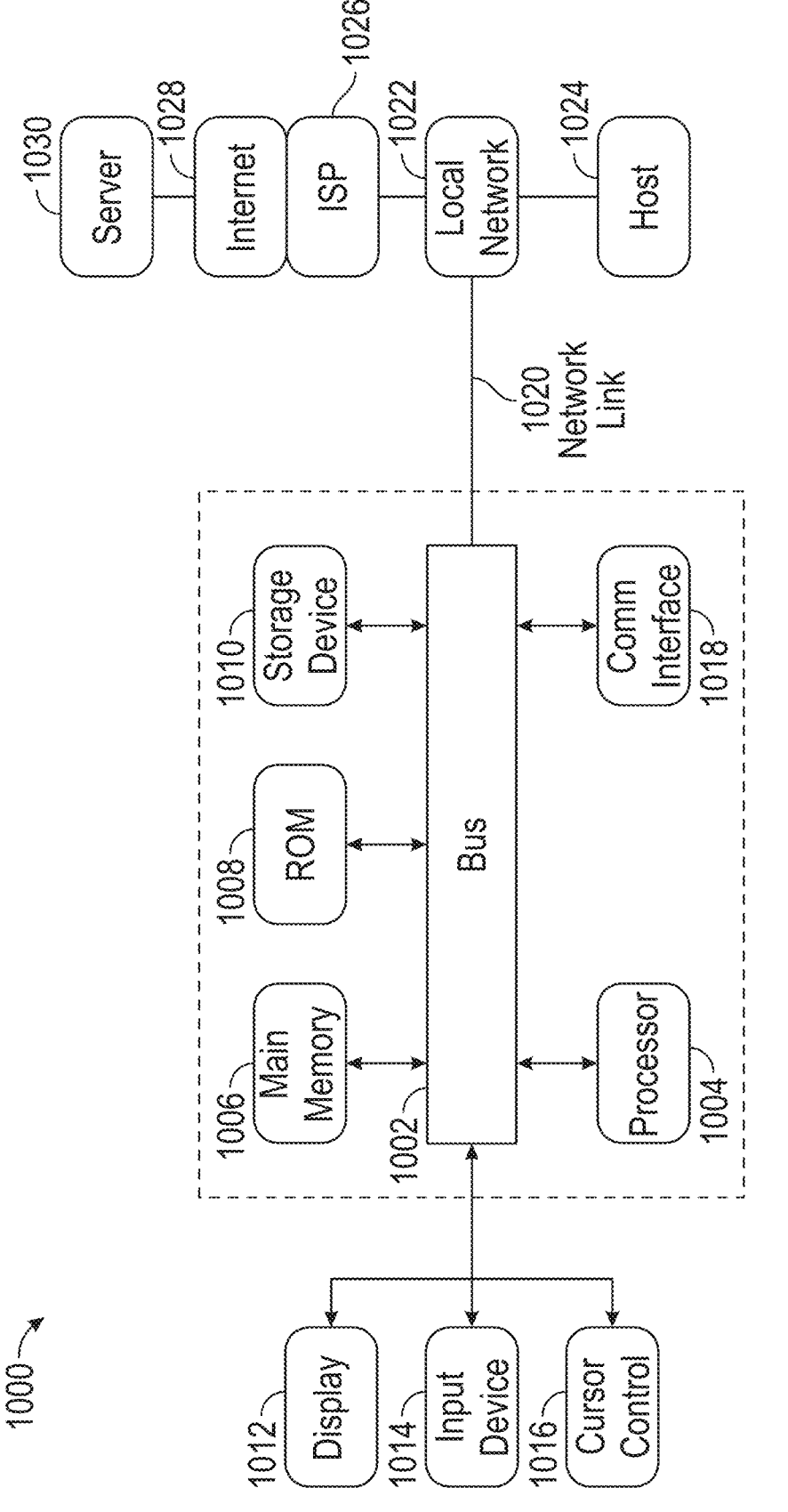
FIG. 7 illustrates an environment in which some embodiments can operate.

For example, FIG. 7 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

In some embodiments, one or more AI models can be implemented in one or more application integrated circuits for an artificial intelligence such as an artificial neural network (ANN). Such integrated circuits can represent a plurality of neurons organized in an array, where each neuron includes a register, a microprocessor, and each neuron receives at least one input. The integrated circuits can further represent a plurality of synaptic circuits, each synaptic circuit including a memory for storing a synaptic weight, where each neuron is connected to at least one other neuron via one of the plurality of the synaptic circuits.

Weights in a neural network are values that determine the importance of the input signals that a neuron receives. Weights are learnable parameters of the neural network. When a neuron receives an input signal, the input signal is multiplied by the weight associated with that input signal and provided to the neuron's processing element. The processing element sums all the weighted input signals that the neuron receives to determine the neuron's net input.

An activation function is applied to this net input to produce the neuron's output. The activation function introduces non-linearity into the network, allowing it to learn complex patterns and relationships within the data. Common activation functions include the sigmoid function, which maps the input to a value between 0 and 1, the hyperbolic tangent function, which maps the input to a value between −1 and 1, and the rectified linear unit (ReLU), which outputs the input directly if it is positive, otherwise it outputs zero.

The combination of weights and activation functions allows neural networks to approximate complex functions and make predictions or classifications based on input data. During training, the network adjusts the weights through a process called backpropagation, which involves calculating the gradient of the loss function with respect to each weight and updating the weights in the direction that minimizes the loss. This process is repeated iteratively until the network achieves a satisfactory level of accuracy. It is also possible to use a self-organizing neural network such as a Boltzman machine or an autoencoder.

In a hardware implementation of the described embodiments, one or more of the AI models can be executable on one or more processors, or microprocessors coupled to memory devices. The memory devices can store the executable instructions, related to the AI models. The stored executable instructions can program the processors or microprocessors to generate a plurality of neurons organized in an array in the memory devices. Such hardware in some embodiments can be implemented in a cloud infrastructure. Each neuron can be implemented in the hardware to include or be connected to a register implemented in the processing elements, and to receive at least one neuron input. Each neuron can also be connected to a plurality of synaptic circuits, where each synaptic circuit, in turn includes additional neurons implemented in a synaptic memory for storing a synaptic weight, and an activation function. Each neuron is connected to at least one other neuron via one of the plurality of synaptic circuits. The execution of the AI models can include adjusting the synaptic weights, and executing the activation functions in a plurality of executions or runs of the AI models to generate an output. In some embodiments, time-domain signals can be combined (sensor fusion) in a reservoir architecture neural network, referred to as recurrent network in which the output layer is trained using, for example, a soft max or logistic function.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

EXAMPLES

It will be appreciated that the present disclosure may include any one and up to all of the following examples.

Example 1: A method comprising: providing a plurality of monitors, each monitor comprising: a wireless communication module, a microcontroller, an accelerometer, and a battery module, each monitor configured to collect machine samples from a machine or a subcomponent of the machine in a plant, the monitor in wireless communication with a gateway, the gateway configured to transmit the samples to one or more servers in a maintenance and monitoring infrastructure; in a machine, having two or more subcomponents, affixing monitors to the machine and/or the subcomponents, wherein the subcomponents comprise rotating elements, each rotating element of a subcomponent, having a corresponding rotation speed; a first monitor, collecting samples from a first subcomponent of the machine, generating a first monitor output sample waveform; the first monitor comprising a magnetometer; the first monitor, sensing a magnetic field, generated by a rotating element of the first subcomponent, the magnetic field proportional to the rotating speed of the first subcomponent; translating the sensed magnetic field to a rotation speed of the first subcomponent; a rotation speed estimator, receiving the translated rotation speed of the first subcomponent; the rotation speed estimator, generating an estimated rotation speed of the first subcomponent; wherein the rotation speeds of the subcomponents are related with a relationship function; determining rotation speeds of the remaining subcomponents, based on the relationship function and the estimated rotation speed; providing the determined rotation speeds as input to one or more maintenance models; the one or more maintenance models, generating a diagnosis or detection of a maintenance issue in the machine, based at least in part on the determined rotation speeds.

Example 2: The method of Example 1, wherein the samples comprise vibration samples.

Example 3: The method of any of Examples 1 and 2, further comprising: the rotation speed estimator, selecting an initial guess for the rotation speed of the first subcomponent; the rotation speed estimator, generating the estimated rotation speed of the first subcomponent, at least in part by determining the harmonics of a vibration signal from the first subcomponent; and the rotation speed estimator, iteratively improving the initial guess, based on the determined harmonics.

Example 4: The method of any of Examples 1-3, wherein the rotation speed estimator generates the estimated rotation speed of the first component, at least in part by selecting an initial guess for the rotation speed; and the initial guess comprises the translated rotation speed of the first subcomponent obtained from the sensed magnetic field.

Example 5: The method of any of Examples 1-4, further comprising: the remaining monitors collecting samples from the remaining subcomponents; each monitor generating a sample output; synchronizing the sample outputs; and wherein determining the rotation speeds of the remaining subcomponents are based on applying the relationship function to the synchronized sample outputs.

Example 6: The method of any of Examples 1-5, further comprising: the remaining monitors collecting samples from the remaining subcomponents; each monitor generating a sample output; and synchronizing the sample outputs, wherein synchronization comprises: the gateway periodically broadcasting synchronization pings to the monitors, the synchronization ping comprising a ping identifier; the monitors, generating alignment reference points, by recording a sample identifier of the sample being collected when the monitors receive a synchronization ping; and aligning the sample outputs, based on the alignment reference points, wherein determining the rotation speeds of the remaining subcomponents are based on applying the relationship function to the synchronized sample outputs.

Example 7: The method of any of Examples 1-6, further comprising: the remaining monitors collecting samples from the remaining subcomponents; each monitor generating a sample output; and synchronizing the sample outputs, wherein synchronization comprises: initializing the monitors to begin sampling at a selected time; the gateway broadcasting a synchronization ping to the monitors; the monitors recording a ping reception time when receiving the ping; synchronizing the monitors, based on differences in ping reception times.

Example 8: The method of any of Examples 1-7, wherein the subcomponents comprise at least one rotating element generating a detectable magnetic field.

Example 9: The method of any of Examples 1-8, further comprising: selecting a second subcomponent; selecting a machine operation relationship comprising frequency as a function of the rotation speed of the second subcomponent; determining a rotation speed of the second subcomponent, based at least in part, on the estimated rotation speed of the first subcomponent and the relationship function; and selecting a spectrum range, based at least in part on the determined rotation speed of the second subcomponent and the machine operation relationship; and instructing a second monitor corresponding to the second subcomponent to collect samples based on the selected spectrum range.

Example 10: The method of any of Examples 1-9, further comprising independently configuring each monitor with a sampling profile instruction.

Example 11: A system comprising: a plurality of monitors, each monitor comprising: a wireless communication module, a microcontroller, an accelerometer, and a battery module, each monitor configured to collect machine samples from a machine or a subcomponent of the machine in a plant, the monitor in wireless communication with a gateway, the gateway configured to transmit the samples to one or more servers in a maintenance and monitoring infrastructure; in a machine, having two or more subcomponents, monitors affixed to the machine and/or the subcomponents, wherein the subcomponents comprise rotating elements, each rotating element of a subcomponent, having a corresponding rotation speed; the system comprising one or more processors, wherein the one or more processors are configured to perform or cause to perform operations comprising: a first monitor, collecting samples from a first subcomponent of the machine, generating a first monitor output sample waveform; wherein the first monitor comprises a magnetometer; the first monitor, sensing a magnetic field, generated by a rotating element of the first subcomponent, the magnetic field proportional to the rotating speed of the first subcomponent; translating the sensed magnetic field to a rotation speed of the first subcomponent; with a rotation speed estimator, receiving the translated rotation speed of the first subcomponent; with the rotation speed estimator, generating an estimated rotation speed of the first subcomponent; wherein the rotation speeds of the subcomponents are related with a relationship function; determining rotation speeds of the remaining subcomponents, based on the relationship function and the estimated rotation speed; providing the determined rotation speeds as input to one or more maintenance models; the one or more maintenance models, generating a diagnosis or detection of a maintenance issue in the machine, based at least in part on the determined rotation speeds.

Example 12: The system of Example 11, wherein the samples comprise vibration samples.

Example 13: The system of any of Examples 11 and 12, wherein the operations further comprise: the rotation speed estimator, selecting an initial guess for the rotation speed of the first subcomponent; the rotation speed estimator, generating the estimated rotation speed of the first subcomponent, at least in part by determining the harmonics of a vibration signal from the first subcomponent; and the rotation speed estimator, iteratively improving the initial guess, based on the determined harmonics.

Example 14: The system of any of Examples 11-13, wherein the rotation speed estimator generates the estimated rotation speed of the first component, at least in part by selecting an initial guess for the rotation speed; and the initial guess comprises the translated rotation speed of the first subcomponent obtained from the sensed magnetic field.

Example 15: The system of any of Examples 11-14, wherein the operations further comprise: the remaining monitors collecting samples from the remaining subcomponents; each monitor generating a sample output; synchronizing the sample outputs; and wherein determining the rotation speeds of the remaining subcomponents are based on applying the relationship function to the synchronized sample outputs.

Example 16: The system of any of Examples 11-15, wherein the operations further comprise: the remaining monitors collecting samples from the remaining subcomponents; each monitor generating a sample output; and synchronizing the sample outputs, wherein synchronization comprises: the gateway periodically broadcasting synchronization pings to the monitors, the synchronization ping comprising a ping identifier; the monitors, generating alignment reference points, by recording a sample identifier of the sample being collected when the monitors receive a synchronization ping; and aligning the sample outputs, based on the alignment reference points, wherein determining the rotation speeds of the remaining subcomponents are based on applying the relationship function to the synchronized sample outputs.

Example 17: The system of any of Examples 11-16, wherein the operations further comprise: the remaining monitors collecting samples from the remaining subcomponents; each monitor generating a sample output; and synchronizing the sample outputs, wherein synchronization comprises: initializing the monitors to begin sampling at a selected time; the gateway broadcasting a synchronization ping to the monitors; the monitors recording a ping reception time when receiving the ping; synchronizing the monitors, based on differences in ping reception times.

Example 18: The system of any of Examples 11-17, wherein the subcomponents comprise at least one rotating element generating a detectable magnetic field.

Example 19: The system of any of Examples 11-18, wherein the operations further comprise: selecting a second subcomponent; selecting a machine operation relationship comprising frequency as a function of the rotation speed of the second subcomponent; determining a rotation speed of the second subcomponent, based at least in part, on the estimated rotation speed of the first subcomponent and the relationship function; and selecting a spectrum range, based at least in part on the determined rotation speed of the second subcomponent and the machine operation relationship; and instructing a second monitor corresponding to the second subcomponent to collect samples based on the selected spectrum range.

Example 20: The system of any of Examples 11-19, wherein the operations further comprise independently configuring each monitor with a sampling profile instruction.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method comprising:

providing a plurality of monitors, each monitor comprising: a wireless communication module, a microcontroller, an accelerometer, and a battery module, each monitor configured to collect machine samples from a machine or a subcomponent of the machine in a plant, the monitor in wireless communication with a gateway, the gateway configured to transmit the samples to one or more servers in a maintenance and monitoring infrastructure;

in a machine, having two or more subcomponents, affixing monitors to the machine and/or the subcomponents, wherein the subcomponents comprise rotating elements, each rotating element of a subcomponent, having a corresponding rotation speed;

a first monitor, collecting samples from a first subcomponent of the machine, generating a first monitor output sample waveform;

the first monitor comprising a magnetometer;

the first monitor, sensing a magnetic field, generated by a rotating element of the first subcomponent, the magnetic field proportional to the rotating speed of the first subcomponent;

translating the sensed magnetic field to a rotation speed of the first subcomponent;

a rotation speed estimator, receiving the translated rotation speed of the first subcomponent;

the rotation speed estimator, generating an estimated rotation speed of the first subcomponent;

wherein the rotation speeds of the subcomponents are related with a relationship function;

determining rotation speeds of the remaining subcomponents, based on the relationship function and the estimated rotation speed;

providing the determined rotation speeds as input to one or more maintenance models;

the one or more maintenance models, generating a diagnosis or detection of a maintenance issue in the machine, based at least in part on the determined rotation speeds.

2. The method of claim 1, wherein the samples comprise vibration samples.

3. The method of claim 1, further comprising:
the rotation speed estimator, selecting an initial guess for the rotation speed of the first subcomponent;
the rotation speed estimator, generating the estimated rotation speed of the first subcomponent, at least in part by determining the harmonics of a vibration signal from the first subcomponent; and
the rotation speed estimator, iteratively improving the initial guess, based on the determined harmonics.

4. The method of claim 1, wherein the rotation speed estimator generates the estimated rotation speed of the first component, at least in part by selecting an initial guess for the rotation speed; and the initial guess comprises the translated rotation speed of the first subcomponent obtained from the sensed magnetic field.

5. The method of claim 1, further comprising:
the remaining monitors collecting samples from the remaining subcomponents;
each monitor generating a sample output;
synchronizing the sample outputs; and
wherein determining the rotation speeds of the remaining subcomponents are based on applying the relationship function to the synchronized sample outputs.

6. The method of claim 1, further comprising:
the remaining monitors collecting samples from the remaining subcomponents;
each monitor generating a sample output; and
synchronizing the sample outputs, wherein synchronization comprises:
the gateway periodically broadcasting synchronization pings to the monitors, the synchronization ping comprising a ping identifier;
the monitors, generating alignment reference points, by recording a sample identifier of the sample being collected when the monitors receive a synchronization ping; and
aligning the sample outputs, based on the alignment reference points,
wherein determining the rotation speeds of the remaining subcomponents are based on applying the relationship function to the synchronized sample outputs.

7. The method of claim 1, further comprising:
the remaining monitors collecting samples from the remaining subcomponents;
each monitor generating a sample output; and
synchronizing the sample outputs, wherein synchronization comprises:
initializing the monitors to begin sampling at a selected time;
the gateway broadcasting a synchronization ping to the monitors;
the monitors recording a ping reception time when receiving the ping;
synchronizing the monitors, based on differences in ping reception times.

8. The method of claim 1, wherein the subcomponents comprise at least one rotating element generating a detectable magnetic field.

9. The method of claim 1, further comprising:
selecting a second subcomponent;

selecting a machine operation relationship comprising frequency as a function of the rotation speed of the second subcomponent;
determining a rotation speed of the second subcomponent, based at least in part, on the estimated rotation speed of the first subcomponent and the relationship function; and
selecting a spectrum range, based at least in part on the determined rotation speed of the second subcomponent and the machine operation relationship; and
instructing a second monitor corresponding to the second subcomponent to collect samples based on the selected spectrum range.

10. The method of claim 1, further comprising independently configuring each monitor with a sampling profile instruction.

11. A system comprising:
a plurality of monitors, each monitor comprising: a wireless communication module, a microcontroller, an accelerometer, and a battery module, each monitor configured to collect machine samples from a machine or a subcomponent of the machine in a plant, the monitor in wireless communication with a gateway, the gateway configured to transmit the samples to one or more servers in a maintenance and monitoring infrastructure;
in a machine, having two or more subcomponents, monitors affixed to the machine and/or the subcomponents, wherein the subcomponents comprise rotating elements, each rotating element of a subcomponent, having a corresponding rotation speed;
the system comprising one or more processors, wherein the one or more processors are configured to perform or cause to perform operations comprising:
a first monitor, collecting samples from a first subcomponent of the machine, generating a first monitor output sample waveform;
wherein the first monitor comprises a magnetometer;
the first monitor, sensing a magnetic field, generated by a rotating element of the first subcomponent, the magnetic field proportional to the rotating speed of the first subcomponent;
translating the sensed magnetic field to a rotation speed of the first subcomponent;
with a rotation speed estimator, receiving the translated rotation speed of the first subcomponent;
with the rotation speed estimator, generating an estimated rotation speed of the first subcomponent;
wherein the rotation speeds of the subcomponents are related with a relationship function;
determining rotation speeds of the remaining subcomponents, based on the relationship function and the estimated rotation speed;
providing the determined rotation speeds as input to one or more maintenance models;
the one or more maintenance models, generating a diagnosis or detection of a maintenance issue in the machine, based at least in part on the determined rotation speeds.

12. The system of claim 11, wherein the samples comprise vibration samples.

13. The system of claim 11, wherein the operations further comprise:
the rotation speed estimator, selecting an initial guess for the rotation speed of the first subcomponent;
the rotation speed estimator, generating the estimated rotation speed of the first subcomponent, at least in part by determining the harmonics of a vibration signal from the first subcomponent; and the rotation speed estimator, iteratively improving the initial guess, based on the determined harmonics.

14. The system of claim 11, wherein the rotation speed estimator generates the estimated rotation speed of the first component, at least in part by selecting an initial guess for the rotation speed; and the initial guess comprises the translated rotation speed of the first subcomponent obtained from the sensed magnetic field.

15. The system of claim 11, wherein the operations further comprise:

the remaining monitors collecting samples from the remaining subcomponents;

each monitor generating a sample output;

synchronizing the sample outputs; and wherein determining the rotation speeds of the remaining subcomponents are based on applying the relationship function to the synchronized sample outputs.

16. The system of claim 11, wherein the operations further comprise:

the remaining monitors collecting samples from the remaining subcomponents;

each monitor generating a sample output; and synchronizing the sample outputs, wherein synchronization comprises:

the gateway periodically broadcasting synchronization pings to the monitors, the synchronization ping comprising a ping identifier;

the monitors, generating alignment reference points, by recording a sample identifier of the sample being collected when the monitors receive a synchronization ping; and aligning the sample outputs, based on the alignment reference points, wherein determining the rotation speeds of the remaining subcomponents are based on applying the relationship function to the synchronized sample outputs.

17. The system of claim 11, wherein the operations further comprise:

the remaining monitors collecting samples from the remaining subcomponents;

each monitor generating a sample output; and synchronizing the sample outputs, wherein synchronization comprises:

initializing the monitors to begin sampling at a selected time;

the gateway broadcasting a synchronization ping to the monitors;

the monitors recording a ping reception time when receiving the ping;

synchronizing the monitors, based on differences in ping reception times.

18. The system of claim 11, wherein the subcomponents comprise at least one rotating element generating a detectable magnetic field.

19. The system of claim 11, wherein the operations further comprise:

selecting a second subcomponent;

selecting a machine operation relationship comprising frequency as a function of the rotation speed of the second subcomponent;

determining a rotation speed of the second subcomponent, based at least in part, on the estimated rotation speed of the first subcomponent and the relationship function; and selecting a spectrum range, based at least in part on the determined rotation speed of the second subcomponent and the machine operation relationship; and instructing a second monitor corresponding to the second subcomponent to collect samples based on the selected spectrum range.

20. The system of claim 11, wherein the operations further comprise independently configuring each monitor with a sampling profile instruction.

* * * * *